(12) United States Patent
Miskin et al.

(10) Patent No.: US 10,986,714 B2
(45) Date of Patent: Apr. 20, 2021

(54) LIGHTING SYSTEM HAVING TWO OR MORE LED PACKAGES HAVING A SPECIFIED SEPARATION DISTANCE

(71) Applicant: Lynk Labs, Inc., Elgin, IL (US)

(72) Inventors: Michael Miskin, Sleepy Hollow, IL (US); Robert L. Kottritsch, Shefford (GB)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 15/334,001

(22) Filed: Oct. 25, 2016

(65) Prior Publication Data

US 2017/0105256 A1 Apr. 13, 2017

Related U.S. Application Data

(63) Continuation-in-part of application No. 14/172,644, filed on Feb. 4, 2014, now Pat. No. 9,750,098, which is a continuation of application No. 13/322,796, filed as application No. PCT/US2010/001597 on May 28, 2010, now Pat. No. 8,648,539, which is a continuation-in-part of application No. 12/287,267, filed on Oct. 6, 2008, now Pat. No. 8,179,055.

(60) Provisional application No. 61/217,215, filed on May 28, 2009, provisional application No. 60/997,771, filed on Oct. 6, 2007.

(51) Int. Cl.
  *H05B 45/37* (2020.01)
  *H05B 45/40* (2020.01)

(52) U.S. Cl.
  CPC ............ *H05B 45/37* (2020.01); *H05B 45/40* (2020.01); *Y10T 29/49002* (2015.01)

(58) Field of Classification Search
  CPC . H01L 25/0753; H01L 25/0756; H05B 45/37; H05B 45/40; Y10T 29/49002
  USPC ...... 257/79, 88; 315/185 R, 291; 362/249.02
  See application file for complete search history.

(56) References Cited

U.S. PATENT DOCUMENTS

| | | |
|---|---|---|
| 3,869,641 A | 3/1975 | Goldberg |
| 4,218,627 A | 8/1980 | Kiesel |
| 4,271,408 A * | 6/1981 | Teshima ................. G08G 1/095 340/815.45 |
| 4,298,869 A | 11/1981 | Okuno |
| 5,469,020 A | 11/1995 | Herrick |
| 5,636,303 A | 6/1997 | Che et al. |
| 5,699,218 A | 12/1997 | Kadah |
| 5,790,013 A | 8/1998 | Hauck |
| 5,803,579 A | 9/1998 | Turnbull et al. |
| 5,936,599 A | 8/1999 | Reymond |

(Continued)

FOREIGN PATENT DOCUMENTS

| | | | | |
|---|---|---|---|---|
| EP | 1076476 A3 * | 3/2002 | ......... | H05B 33/0815 |
| EP | 1 215 944 A1 | 6/2002 | | |

(Continued)

OTHER PUBLICATIONS

Citizen Electronics Co., Ltd.'s datasheet for CL-820-U1N CITILEDs dated Aug. 6, 2007.

(Continued)

*Primary Examiner* — Daniel D Chang
(74) *Attorney, Agent, or Firm* — K&L Gates LLP

(57) ABSTRACT

An LED lighting system is disclosed. In an example, an LED lighting system includes at least one lighting device, at least one driver, an LED circuit, and a switch. The driver has at least one bridge rectifier. The driver has a first voltage input from a mains power source and provides a second lower voltage output to the at least one lighting device. The LED circuit has two or more LEDs integrated in the at least one lighting device. The switch is integrated in the at least one lighting device and controllable by an end user. Additionally, the lighting device is configured to provide multiple brightness levels and/or color levels in response to control of the switch by the end user.

13 Claims, 5 Drawing Sheets

(56) References Cited

U.S. PATENT DOCUMENTS

| | | |
|---|---|---|
| 6,016,038 A | 1/2000 | Mueller et al. |
| 6,028,694 A | 2/2000 | Schmidt |
| 6,072,280 A | 6/2000 | Allen |
| 6,072,475 A | 6/2000 | van Ketwich |
| 6,107,744 A | 8/2000 | Bavaro et al. |
| 6,127,783 A | 10/2000 | Pashley et al. |
| 6,234,648 B1 | 5/2001 | Borner |
| 6,292,901 B1 | 9/2001 | Lys et al. |
| 6,357,889 B1 | 3/2002 | Duggal et al. |
| 6,412,971 B1 | 7/2002 | Wojnarowski et al. |
| 6,528,954 B1 | 3/2003 | Lys et al. |
| 6,541,919 B1 | 4/2003 | Roach et al. |
| 6,548,967 B1 | 4/2003 | Dowling et al. |
| 6,559,802 B2 | 5/2003 | Goto et al. |
| 6,580,228 B1 | 6/2003 | Chen et al. |
| 6,614,103 B1 | 9/2003 | Durocher et al. |
| 6,636,003 B2 | 10/2003 | Rahm et al. |
| 6,641,294 B2 * | 11/2003 | Lefebvre .................. B60Q 3/47 362/544 |
| 6,667,497 B1 | 12/2003 | Huang et al. |
| 6,714,348 B2 | 3/2004 | Dunn |
| 6,762,562 B2 | 7/2004 | Leong |
| 6,781,570 B1 | 8/2004 | Arrigo et al. |
| 6,828,596 B2 | 12/2004 | Steigerwald et al. |
| 6,861,658 B2 | 3/2005 | Fiset |
| 6,909,234 B2 | 6/2005 | Chen |
| 7,014,336 B1 | 3/2006 | Ducharme et al. |
| 7,019,062 B2 | 3/2006 | van Beek et al. |
| 7,038,399 B2 | 5/2006 | Lys et al. |
| 7,053,560 B1 | 5/2006 | Ng |
| 7,064,498 B2 | 6/2006 | Dowling et al. |
| 7,081,722 B1 | 7/2006 | Huynh et al. |
| 7,288,902 B1 | 10/2007 | Melanson |
| 7,339,198 B2 | 3/2008 | Shen |
| 7,344,279 B2 | 3/2008 | Mueller et al. |
| 7,400,439 B2 * | 7/2008 | Holman .................... F21S 8/08 359/298 |
| 7,462,997 B2 | 12/2008 | Mueller et al. |
| 7,489,086 B2 | 2/2009 | Miskin et al. |
| 7,535,028 B2 | 5/2009 | Fan et al. |
| 7,583,901 B2 | 9/2009 | Nakagawa et al. |
| 7,748,877 B1 | 7/2010 | Colby |
| 7,859,196 B2 | 12/2010 | Lee et al. |
| 8,076,680 B2 * | 12/2011 | Lee ........................... F21K 9/00 257/100 |
| 8,129,917 B2 | 3/2012 | Kim et al. |
| 8,148,905 B2 | 4/2012 | Miskin et al. |
| 8,179,055 B2 | 5/2012 | Miskin et al. |
| 8,198,819 B2 | 6/2012 | Lenk |
| 8,272,757 B1 | 9/2012 | Fan et al. |
| 8,314,571 B2 | 11/2012 | Jonsson |
| 8,378,374 B2 * | 2/2013 | Loh ..................... H01L 25/0753 257/675 |
| 8,384,299 B1 * | 2/2013 | Burdalski .......... H05B 33/0803 315/185 S |
| 8,531,118 B2 | 9/2013 | Miskin et al. |
| 8,648,539 B2 | 2/2014 | Miskin et al. |
| 8,841,855 B2 | 9/2014 | Miskin |
| 9,184,497 B2 | 11/2015 | Chen et al. |
| 9,198,237 B2 | 11/2015 | Miskin et al. |
| 2001/0054005 A1 | 12/2001 | Hook et al. |
| 2002/0048169 A1 | 4/2002 | Dowling et al. |
| 2002/0060526 A1 | 5/2002 | Timmermans et al. |
| 2002/0181231 A1 | 12/2002 | Luk |
| 2003/0043611 A1 | 3/2003 | Bockle et al. |
| 2003/0100837 A1 | 7/2003 | Piepgras et al. |
| 2003/0122502 A1 | 7/2003 | Clauberg et al. |
| 2003/0137258 A1 | 7/2003 | Piepgras et al. |
| 2003/0156422 A1 | 8/2003 | Tatewaki et al. |
| 2003/0169014 A1 | 9/2003 | Kadah |
| 2003/0175004 A1 | 9/2003 | Garito et al. |
| 2003/0219035 A1 | 11/2003 | Schmidt |
| 2004/0075399 A1 | 4/2004 | Hall |
| 2004/0080941 A1 | 4/2004 | Jiang et al. |
| 2004/0183380 A1 | 9/2004 | Otake |
| 2004/0189218 A1 | 9/2004 | Leong et al. |
| 2004/0201988 A1 | 10/2004 | Allen |
| 2004/0206970 A1 | 10/2004 | Martin |
| 2004/0218387 A1 | 11/2004 | Gerlach |
| 2004/0264193 A1 | 12/2004 | Okumura |
| 2005/0040773 A1 | 2/2005 | Lebens et al. |
| 2005/0110426 A1 | 5/2005 | Shao |
| 2005/0128751 A1 | 6/2005 | Roberge et al. |
| 2005/0168156 A1 | 8/2005 | Li et al. |
| 2005/0173990 A1 | 8/2005 | Anderson et al. |
| 2005/0195600 A1 | 9/2005 | Porchia et al. |
| 2006/0038542 A1 | 2/2006 | Park et al. |
| 2006/0103913 A1 | 5/2006 | Handschy et al. |
| 2006/0138971 A1 | 6/2006 | Uang et al. |
| 2006/0158130 A1 | 7/2006 | Furukawa |
| 2006/0176692 A1 | 8/2006 | Lee et al. |
| 2006/0238136 A1 | 10/2006 | Johnson, III et al. |
| 2006/0256826 A1 | 11/2006 | Lin et al. |
| 2006/0285332 A1 | 12/2006 | Goon et al. |
| 2007/0069663 A1 | 3/2007 | Burdalski et al. |
| 2007/0103899 A1 * | 5/2007 | Takikawa .................. F21K 9/00 362/227 |
| 2007/0115248 A1 | 5/2007 | Roberts et al. |
| 2007/0247852 A1 | 10/2007 | Wang |
| 2007/0258231 A1 | 11/2007 | Koerner et al. |
| 2008/0017871 A1 * | 1/2008 | Lee ..................... H01L 25/0753 257/88 |
| 2008/0094005 A1 | 4/2008 | Rabiner et al. |
| 2008/0094837 A1 | 4/2008 | Dobbins et al. |
| 2008/0116816 A1 | 5/2008 | Neuman et al. |
| 2008/0116818 A1 | 5/2008 | Shteynberg et al. |
| 2008/0136347 A1 | 6/2008 | Lin et al. |
| 2008/0158915 A1 | 7/2008 | Williams |
| 2008/0203405 A1 | 8/2008 | Rooymans |
| 2008/0203936 A1 | 8/2008 | Mariyama et al. |
| 2008/0211421 A1 | 9/2008 | Lee et al. |
| 2008/0218098 A1 | 9/2008 | Lee et al. |
| 2008/0252197 A1 | 10/2008 | Li et al. |
| 2009/0009100 A1 | 1/2009 | Rooymans |
| 2009/0021185 A1 | 1/2009 | Ng |
| 2009/0079362 A1 | 3/2009 | Shteynberg et al. |
| 2009/0134413 A1 * | 5/2009 | Roth ..................... C09K 11/663 257/98 |
| 2009/0167190 A1 | 7/2009 | Hickey |
| 2009/0289267 A1 * | 11/2009 | Burdalski .......... H05B 33/0803 257/88 |
| 2009/0295300 A1 | 12/2009 | King |
| 2010/0039794 A1 | 2/2010 | Ghanem et al. |
| 2010/0045202 A1 * | 2/2010 | That ...................... H05B 45/50 315/291 |
| 2010/0072905 A1 | 3/2010 | Kim et al. |
| 2010/0109564 A1 | 5/2010 | Shin et al. |
| 2010/0259183 A1 | 10/2010 | Leshniak |
| 2010/0277084 A1 * | 11/2010 | Lee ..................... H05B 33/0806 315/192 |
| 2010/0308738 A1 | 12/2010 | Shteynberg et al. |
| 2011/0001422 A1 * | 1/2011 | Aanegola .......... H01L 25/0753 313/501 |
| 2011/0115407 A1 | 5/2011 | Wibben et al. |
| 2011/0148327 A1 | 6/2011 | Van de Ven et al. |
| 2011/0169408 A1 | 7/2011 | Chen et al. |
| 2011/0260648 A1 | 10/2011 | Hamamoto et al. |
| 2012/0043897 A1 | 2/2012 | Miskin et al. |
| 2012/0268008 A1 | 10/2012 | Miskin et al. |
| 2012/0293083 A1 | 11/2012 | Miskin et al. |
| 2013/0051001 A1 | 2/2013 | Miskin |
| 2016/0095180 A1 | 3/2016 | Miskin |

FOREIGN PATENT DOCUMENTS

| | | |
|---|---|---|
| JP | S6230386 | 2/1987 |
| JP | 08-137429 | 5/1996 |
| JP | 11-016683 | 1/1999 |
| JP | 11-330561 A1 | 11/1999 |
| JP | 2000156526 | 6/2000 |
| JP | 2002057376 | 2/2002 |

(56) References Cited

FOREIGN PATENT DOCUMENTS

| | | |
|---|---|---|
| JP | 2001291406 | 4/2003 |
| JP | 2003298118 | 10/2003 |
| JP | 2004111104 | 4/2004 |
| JP | 2005222750 | 8/2005 |
| JP | 2007059260 | 3/2007 |
| JP | 3162876 | 9/2010 |
| WO | 9922338 | 5/1999 |
| WO | 0215320 | 2/2002 |
| WO | 03019072 | 3/2003 |
| WO | 03055273 | 7/2003 |
| WO | WO 03/075126 | 9/2003 |
| WO | 2004094896 | 11/2004 |
| WO | WO2009/045548 A1 | 4/2005 |
| WO | WO 2005084080 | 9/2005 |
| WO | WO 2007001116 | 1/2007 |
| WO | WO 2008/062941 | 5/2008 |
| WO | 2008124701 | 10/2008 |
| WO | WO 2011049613 | 4/2011 |
| WO | WO 2011082168 | 7/2011 |
| WO | WO 2011143510 | 11/2011 |
| WO | 2016164928 A1 | 10/2016 |

OTHER PUBLICATIONS

Fairchild Semiconductor Corporation's "Surface Mount LED Lamp Super Bright 0805" datasheet dated Aug. 30, 2001.
M. Rico-Secades et al., "Driver for high efficiency LED based on flyback stage with current mode control for emergency lighting system," Industry Applications Conference, Oct. 2004, pp. 1655-1659.
International Search Report for International Application PCT/US2008/011536, 14 pages.
Office Action for Related CA Application No. 2,701,780 dated Nov. 6, 2014, 4 pages.
Decision on Institution of Inter Partes Review under 37 CFR 42.108 for U.S. Pat. No. 8,841,855, 40 pages.
Patent Owners Preliminary Response under 37 CFR 42.107 for Case IPR2016-01133 for Inter Partes Review of U.S. Pat. No. 8,841,855, 51 pages.
Lynk Labs, Inc.'s Initial Response to Invalidity Contentions, Northern District of Illinois Civil Action No. 15-cv-04833, 88 pages.
European Search Report dated Oct. 22, 2012 in related European Application, seven (7) pages.
International Search Report and Written Opinion for International Application No. PCT/US2010/001597 dated Jul. 30, 2010 containing 14 pages.
Examination Report Under Sections 12 & 13 of the Patent Act for Indian Application No. 9150/delnp/2011 dated Apr. 5, 2018, 6 pages.
Examination Report Under Sections 12 & 13 of the Patent Act, Indian Application No. 5795/DELNP/2012, dated Aug. 29, 2018, 6 pages.
Office Action, Canadian Application No. 2,763,598, dated Jul. 3, 2018, 3 pages.
Extended European Search Report dated Jan. 14, 2020, Application No. EP19177733.3, 10 pages.

* cited by examiner

LIGHTING SYSTEM HAVING TWO OR MORE LED PACKAGES HAVING A SPECIFIED SEPARATION DISTANCE

RELATED APPLICATIONS

This application is continuation-in-part of U.S. patent application Ser. No. 14/172,644 filed Feb. 4, 2014, which is a continuation of U.S. patent application Ser. No. 13/322, 796 now U.S. Pat. No. 8,648,539, filed Nov. 28, 2011, which is a national phase application of International Application No. PCT/US2010/001597, filed May 28, 2010, which claims priority to U.S. Provisional Application No. 61/217,215, filed May 28, 2009, and is a continuation-in-part of U.S. patent application Ser. No. 12/287,267 now U.S. Pat. No. 8,179,055, filed Oct. 6, 2008, which claims the priority to U.S. Provisional Application No. 60/997,771, filed Oct. 6, 2007; the contents of each of these applications are expressly incorporated herein by reference.

FIELD OF THE INVENTION

The present invention relates generally to light-emitting diode ("LED") circuits and assemblies; and more specifically to scalable alternating current ("AC") driven LED circuits and assemblies.

SUMMARY OF THE INVENTION

While not intending to limit the scope of the claims or disclosure, in brief summary, the present disclosure and claims are directed to providing improved ease of designing and building lighting fixtures using AC-driven LEDs. Disclosed and claimed are LED circuits having scalable circuit configurations and LED package assembly configurations which can be used in an AC-drive platform to more easily match the voltage requirements of the lighting fixture(s) or systems in which the LED's are desired. Circuits and LED package assemblies are claimed and disclosed which reduce objectionable flicker produced from AC-driven LEDs and to produce more light per component. Packaged LED's are provided for lighting design according to the invention which address flicker at low frequencies (e.g. 50/60 Hz) while being scalable as desired for a particular lighting goal without resort to designing individual assemblies at the semiconductor die level. Circuits are also disclosed and claimed which provide for some of the LEDs in a circuit to be on during both positive and negative phases of an AC source, to among other things, address flicker. Also, circuits are claimed and disclosed where a basic circuit design provides a voltage and current performance whereby scalability or matching a particular voltage requirement is achieved by configuring LEDs in the basic design and/or by joining one or more of the basic circuits together in series or parallel to achieve the design requirement.

According to an embodiment of the invention an AC-driven LED circuit is proposed having a first parallel circuit having LEDs. Each LED having an input and an output, and the circuit having at least first and second branches connecting at first and second common points, the common points providing input and output for an AC driving current for the circuit. The first branch having a first and a second LED, and the second branch having a third and a fourth LED. The first LED is connected to the second LED in opposing series relationship with the inputs of the first and second LEDs defining a first branch junction. The third LED is connected to the fourth LED in opposing series with the outputs of the third and fourth LEDs defining a second branch junction. The first and second branches are connected to one another such that the output of the first LED is connected to the input of the third LED at the first common point and the output of the second LED is connected to the input of the fourth LED at the second common point. A first cross-connecting circuit branch having at least a fifth LED, the first cross-connecting circuit being configured such that the input of the fifth LED is connected to second branch junction and the output is connected to the first branch junction.

According to another embodiment of the invention, an AC-driven LED circuit may comprise one or more additional parallel circuits each being the same as the first parallel circuit identified above. Each additional circuit being conductively connected to the first parallel circuit and to one another at their common points for providing an input and an output for an AC driving current of the circuit. According to other embodiments, the additional parallel circuits may be connected in series to the first parallel circuit and to one another or the additional parallel circuits may be connected in parallel to the first parallel circuit and to one another.

According to another embodiment of the invention, n additional LEDs, in pairs, may be provided in the circuit wherein the pairs are configured among the first and second branch circuits of each of the respective parallel circuits, such that current flows through the respective fifth diode of each parallel circuit upon both a negative and positive phase of the AC driving source and so that the current draw through each of the respective parallel circuits during both AC phases is substantially the same.

According to another embodiment the AC-driven LED circuit further comprises x cross-connecting circuit branches each having one or more LEDs and being configured such that current flows through each of the respective one or more LEDS upon both a negative and positive phase of the AC driving source and so that the current draw through each of the respective parallel circuits during both AC phases is substantially the same.

According to another embodiment of the invention, an AC-driven LED assembly comprises at least a first and a second LED each discretely packaged, the LEDs being connected in an AC circuit and each LED package being mounted to a substrate at a distance from the other of preferably approximately 3 mm or less, and more preferably 2.0 mm or less. In an embodiment the packaged LEDs also each have a length of preferably approximately 2.5 mm or less, and more preferably 2.0 mm or less. In an embodiment the packaged LEDs also each have a width of preferably approximately 2.5 mm or less, and more preferably 2.0 mm or less. In an embodiment the LED packages are arranged with respect to each other in a linear spatial relationship while in another embodiment the LED packages are arranged with respect to each other in an XY rectilinear spatial relationship. In an embodiment of the invention, the first and second LEDs may be individual semiconductor die or LED chips.

DETAILED DESCRIPTION OF THE PRESENT INVENTION

Figure 1:
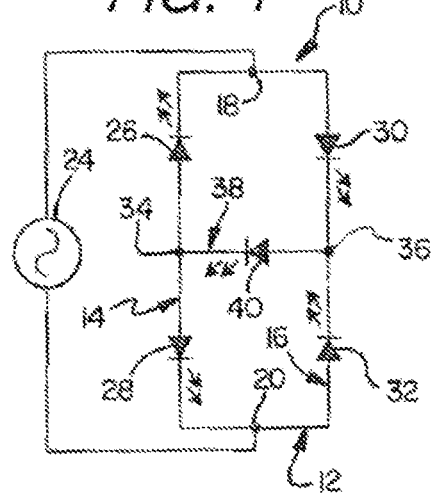
FIG. 1 is a schematic view of an AC-driven LED circuit according to an embodiment of the invention.

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated. Like components in the various FIGS. will be given like reference numbers.

FIG. 1 discloses an AC-driven LED circuit 10 including a first parallel circuit 12 having a first branch 14, and a second branch 16. Branches 14, 16 connect at first common point 18 and second common point 20. The common points 18, 20 provide input and output for an AC driving current from a driver 24 for the circuit. The driver may be, for example, mains power, an electronic transformer, or a magnetic transformer.

The first branch 14 has a first LED 26 and a second LED 28, and the second branch 16 having a third LED 30 and a fourth LED 32. The first LED 26 is connected to the second LED 28 in opposing series relationship with the inputs of the first and second LEDs 26, 28 defining a first branch junction 34. The third LED 30 is connected to the fourth LED 32 in opposing series with the outputs of the third and fourth LEDs 30, 32 defining a second branch junction 36.

The first and second branches 14, 16 are connected to one another such that the output of the first LED 26 is connected to the input of the third LED 30 at the first common point 18 and the output of the second LED 28 is connected to the input of the fourth LED 32 at the second common point 20. A first cross-connecting circuit branch 38 has a fifth LED 40. The first cross-connecting circuit branch 38 being configured such that the input of the fifth LED 40 is connected to second branch junction 36 and the output is connected to the first branch junction 34.

As will be appreciated by those of skill in the art, the LED's 26 and 32 will provide light only upon one half of an AC wave, pulse or phase, while LEDs 28 and 30 will provide light only upon the opposite wave, pulse or phase.

At lower frequencies, e.g. mains frequencies, if the LEDs are spaced pursuant to another aspect of the invention (disclosed below) at preferably approximately 3.0 mm or less preferably approximately 2.0 mm or less, then the amount of noticeable flicker may not be unacceptable. However, the cross connecting circuit 38 and diode 40 will be on (produce light) in both phases of the AC drive and hence mitigate flicker which may be evidenced in its surrounding LEDs 26, 28, 30 and 32.

Figure 2:
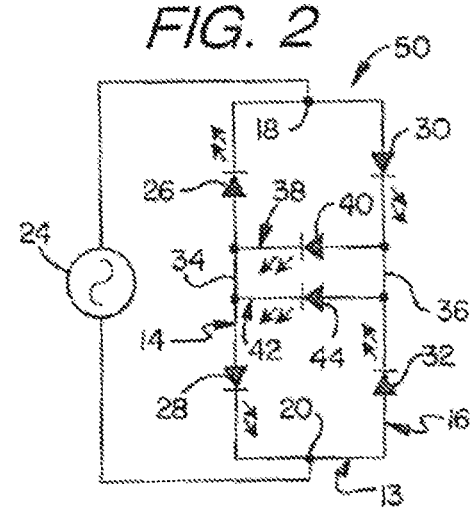
FIG. 2 is a schematic view of an AC-driven LED circuit according to an embodiment of the invention.
Figure 9:
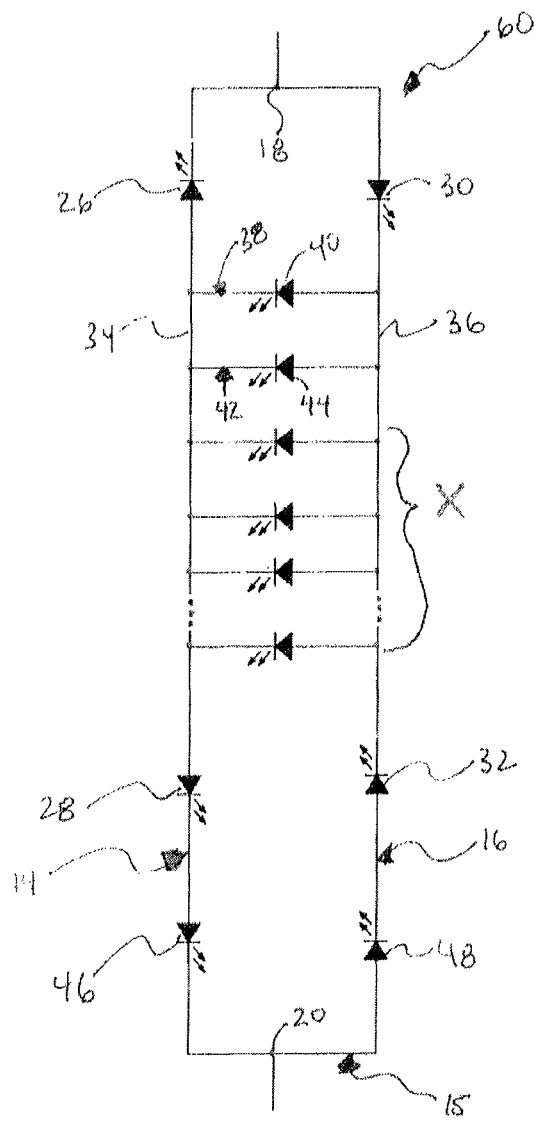
FIG. 9 is a schematic view of an AC-driven LED circuit according to an embodiment of the invention.

FIG. 2 discloses an AC-driven LED circuit 50 which is a modification of AC-driven LED circuit 10. Circuit 50 further mitigates flicker. Circuit 50 provides an additional cross-connecting circuit branch 42 having LED 44. The LEDS 40, 44 are configured such that current flows through each upon both a negative and positive phase of the AC driving source 24. It should be appreciated that according to the invention x number of such cross connecting circuit branches (such as 38, 42) may be added as desired (see for e.g. FIG. 9), however, since the LEDs (such as LEDs 40, 44) are in parallel with each other, their voltage demand will be divided while their current draw will not. Hence a suitable driver need be provided for this circumstance.

Figure 3:
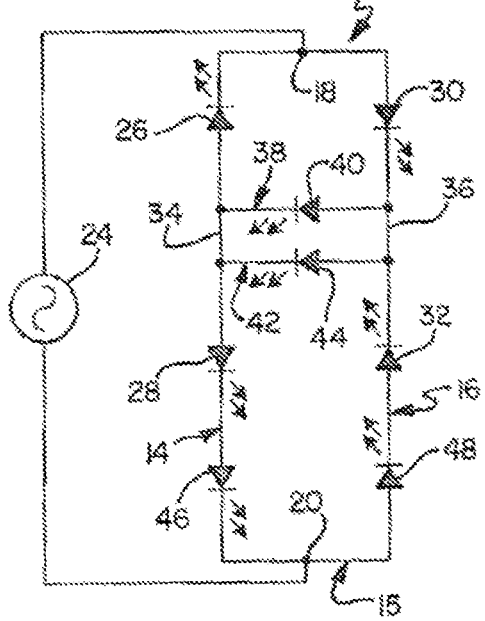
FIG. 3 is a schematic view of an AC-driven LED circuit according to an embodiment of the invention.
Figure 10:
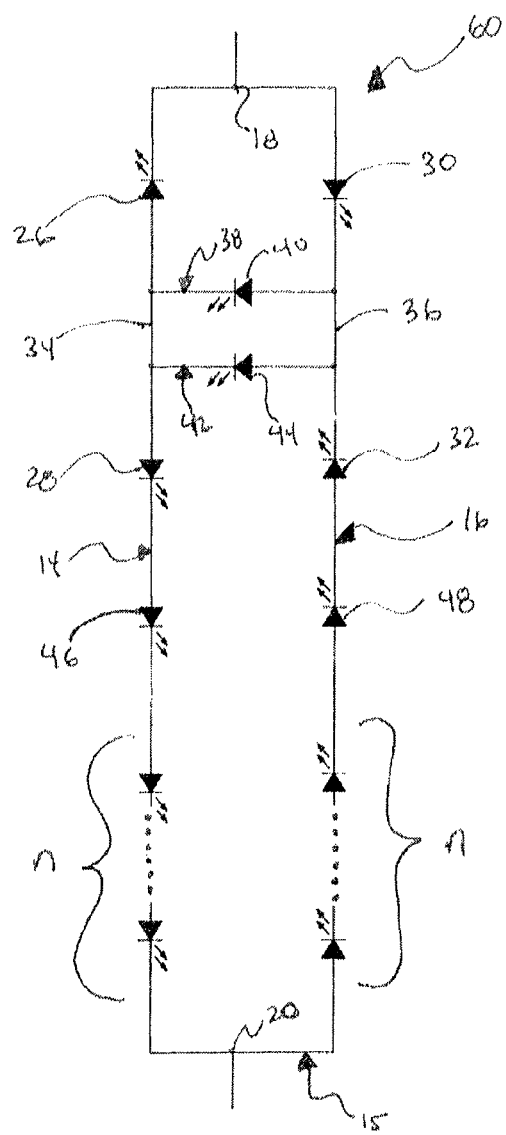
FIG. 10 is a schematic view of an AC-driven LED circuit according to an embodiment of the invention.

To increase the light output of the circuit of the invention, it should be noted as disclosed in FIGS. 3 and 10 that additional or n LEDS may be provided in the branches 14 and 16. Specifically FIG. 3 discloses an AC-driven circuit 60 which is a modification of circuit 50. Circuit 60 provides for additional LEDs 46 and 48. The pair of LEDs are configured among the first and second branch circuits 14, 16 of the parallel circuit 15 such that current flows through the respective diodes 40, 44 upon both a negative and positive phase of the AC driving source 24 and so that the current draw through parallel circuit 15 during both AC phases is substantially the same.

It should be noted that according to the invention, n pairs of LEDs can be configured among first and second branch circuits of a respective parallel circuit (see for e.g., FIG. 10), such that current flows through the respective cross connecting circuit branch LEDs of a parallel circuit upon both a negative and positive phase of the AC driving source and so that the current draw through each of the respective parallel circuits during both AC phases is substantially the same. More LEDs in the branch circuits divide the current from the higher current LEDs in cross connecting circuits 38, 42.

According to another aspect of the invention, to further mitigate the amount of flicker perceived, adding to the light provided and to scalability, additional parallel circuits, each being the same as the first parallel circuit, may be conductively connected to the first parallel circuit in series or parallel at the their common points 18, 20 for providing an input and an output for an AC driving current for the circuit.

Figure 4:
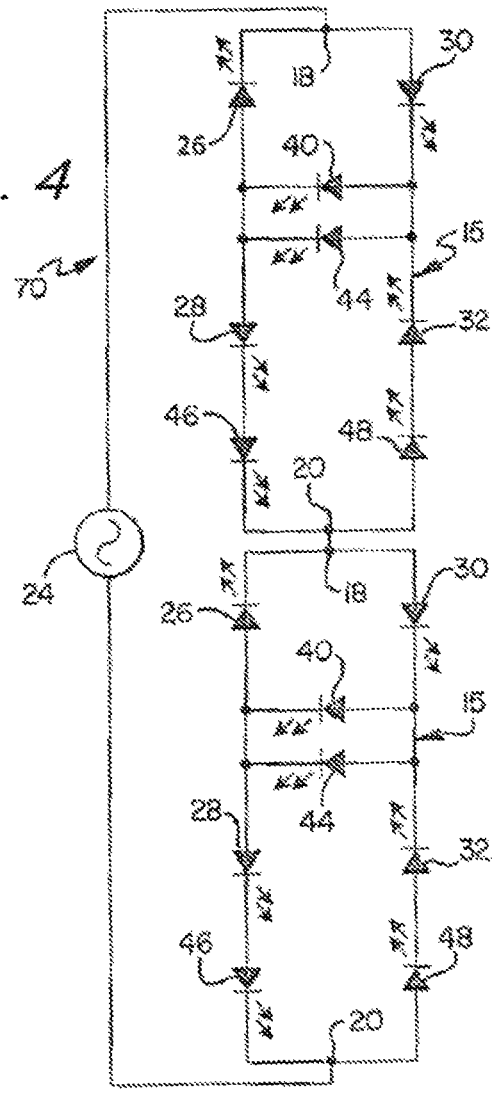
FIG. 4 is a schematic view of an AC-driven LED circuit according to an embodiment of the invention.
Figure 5:
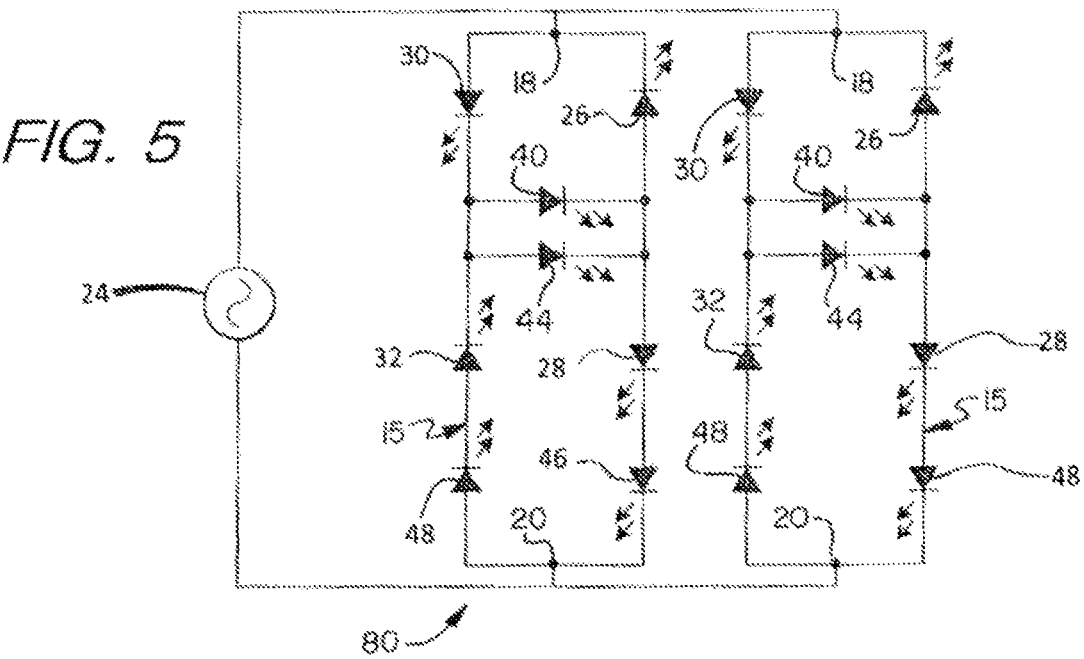
FIG. 5 is a schematic view of an AC-driven LED circuit according to an embodiment of the invention.

For instance, FIG. 4 discloses an AC-driven LED circuit 70 which includes additional parallel circuits 15 connected in series at common points 18, 20. Additionally, as seen in FIG. 5, an AC-driven LED circuit 80 includes additional parallel circuits 15 connected in parallel at common points 18, 20. This embodiment shows the utility of providing a scalable circuit that can be manufactured modularly and used to connect to match higher voltage requirements e.g. circuit 15 may draw drawing 12 V AC while two such circuits 15 in series would meet 24V AC requirements.

Preferably, the number and type of LEDs in the AC-driven LED circuit draws a combined current and combined voltage which is substantially equal to the nominal voltage capacity of the AC drive source.

Figure 6:
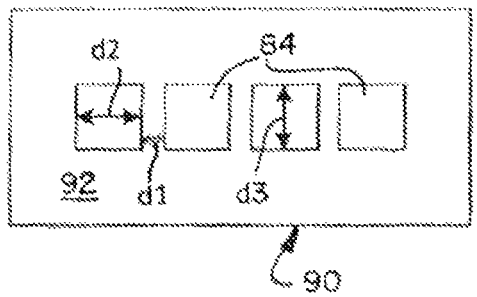
FIG. 6 is a schematic top view of an AC-driven LED assembly according to an embodiment of the invention.

As shown in FIG. 6, an AC-driven LED assembly 90 has a first and a second LED 84 each discretely packaged, the LEDs being connected in an AC circuit and each LED package 84 being mounted to a substrate 92 at a distance d1 from the other of preferably approximately 3 mm or less, and more preferably 2.0 mm or less. The first and second LEDs may be, for example, discrete packaged semiconductor LED die or LED chips. The AC-driven LED assembly 90 also has packaged LEDs 84 each having a width d2 and a length d3 of preferably approximately 2.5 mm or less, and more preferably 2.0 mm or less.

Figure 7:
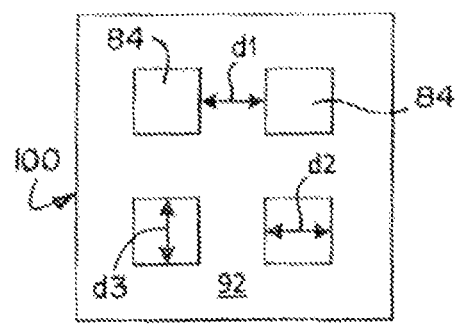
FIG. 7 is a schematic top view of an AC-driven LED assembly according to an embodiment of the invention.

FIG. 6 discloses an AC-driven LED assembly 90 wherein the LED packages 84 are arranged with respect to each other in a linear spatial relationship, while FIG. 7 discloses an assembly 100 wherein the LED packages 84 are arranged with respect to each other in an XY rectilinear spatial relationship.

Figure 8:
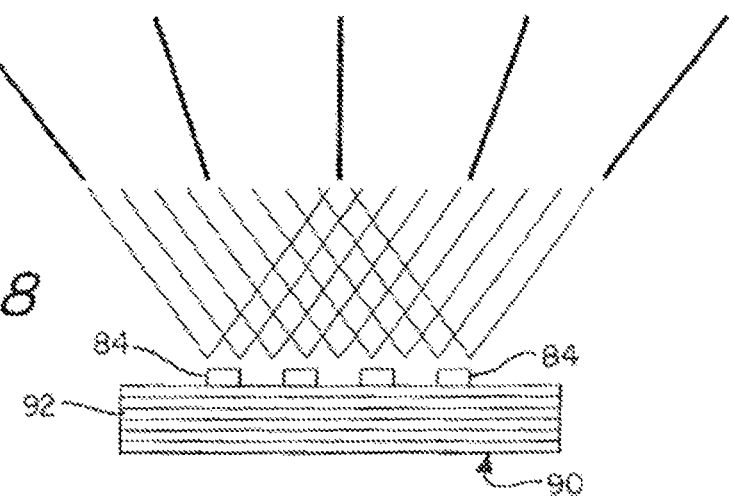
FIG. 8 is a schematic side view of an AC-driven LED assembly according to an embodiment of the invention.

As can be seen in FIG. 8, when LED packages 84 are placed at 3 mm or less, the light produced there from intersects, thereby reducing or eliminating the effects of flicker.

Some standard AC voltage in the world include 12V AC, 24V AC, 100V AC, 110V AC, 120V AC, 220V AC, 230V AC, 240V AC and 277V AC. Therefore, it would be advantageous to have a single chip LED or multi-chip single LED packages that could be easily configured to operate at multiple voltages by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. This invention comprises circuits and devices that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. The desired operating voltage level and/or the desired brightness level electrical connection may be achieved and/or completed at the LED packaging level when the multi-voltage and/or multi-brightness, circuits and/or single chips are integrated into the LED package, or the LED package may have external electrical contacts that match the integrated multi-voltage and/or multi-brightness circuits and/or single chips within, thus allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

According to another aspect of the invention a multi-voltage and/or multi-current single chip AC LED and/or multi-voltage and/or multi current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to another aspect of the invention, at least one single chip multi-current LED bridge circuit is integrated within a LED lamp having a standard lamp base. The single chip multi-current LED bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

As would be known to one skilled in the art, various embodiments of the LED packages, substrates, and assemblies may be produced, such as creating an AC-driven circuit where all circuits and LEDs are formed on a semiconductor, where the LED are discretely packaged apart from the circuits, and where each parallel circuit is formed on a printed circuit board.

While in the preceding there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying Claims.

Figure 11:
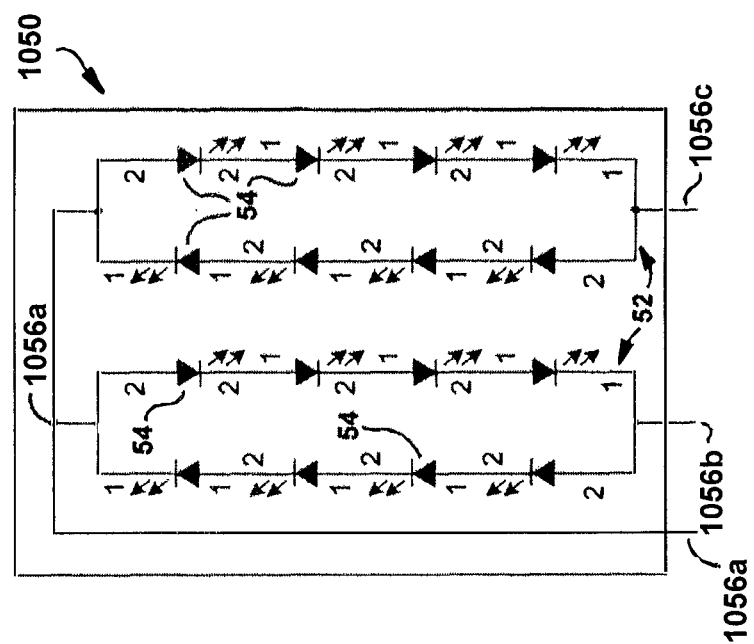
FIG. 11 is a schematic view of a multi-voltage and/or multi-brightness LED lighting device according to an embodiment of the invention.

FIG. 11 discloses a schematic diagram of a multi-voltage and/or multi-brightness LED lighting device 1050. The multi-voltage and/or multi-brightness LED lighting device 1050 comprises at least two AC LED circuits 1052, each of which have at least two LEDs 1054 in series and anti-parallel relation. The at leak two AC LED circuits 1052 have at least three electrical contacts 1056 a, 1056 b and 1056 c. The at least two AC LED circuits 1052 are electrically connected together in parallel at one end 1056 a and left unconnected at the opposing ends of the electrical contacts 1056 b and 1056 c. One side of an AC voltage source line is electrically connected to 1056 a and the other side of an AC voltage source line is individually electrically connected to 1056 b and 1056 c with either a fixed connection or a switched connection thereby providing a first brightness when AC voltage is applied to 1056 a and 1056 b and a second brightness when an AC voltage is applied to 1056 a, 1056 b and 1056 c. It is contemplated that the multi-voltage and/or multi-brightness LED lighting device 1050 is a single chip, an LED package, an LED assembly or an LED lamp. The multi-brightness switching capability.

Figure 12:
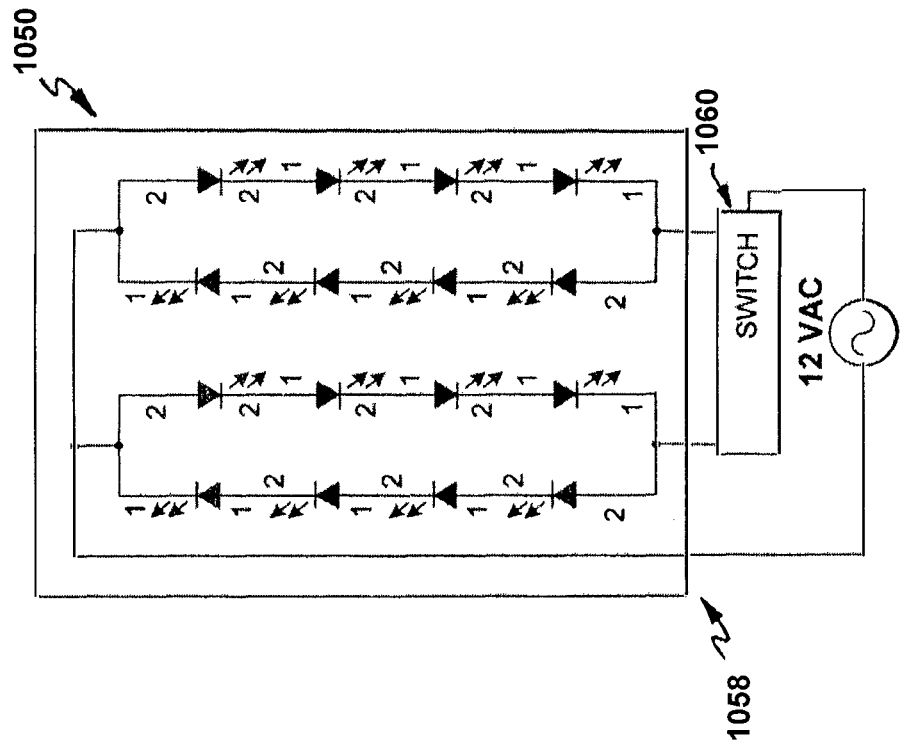
FIG. 12 is a schematic view of a multi-voltage and/or multi-brightness LED lighting device integrated within a lamp according to an embodiment of the invention.

FIG. 12 discloses a schematic diagram similar to the multi-voltage and/or multi-brightness LED device 1050 shown in FIG. 11 integrated within a lamp 1058 and connected to a switch 1060 to control the brightness level of the multi-voltage and/or multi-brightness LED lighting device 1050.

Figure 13:
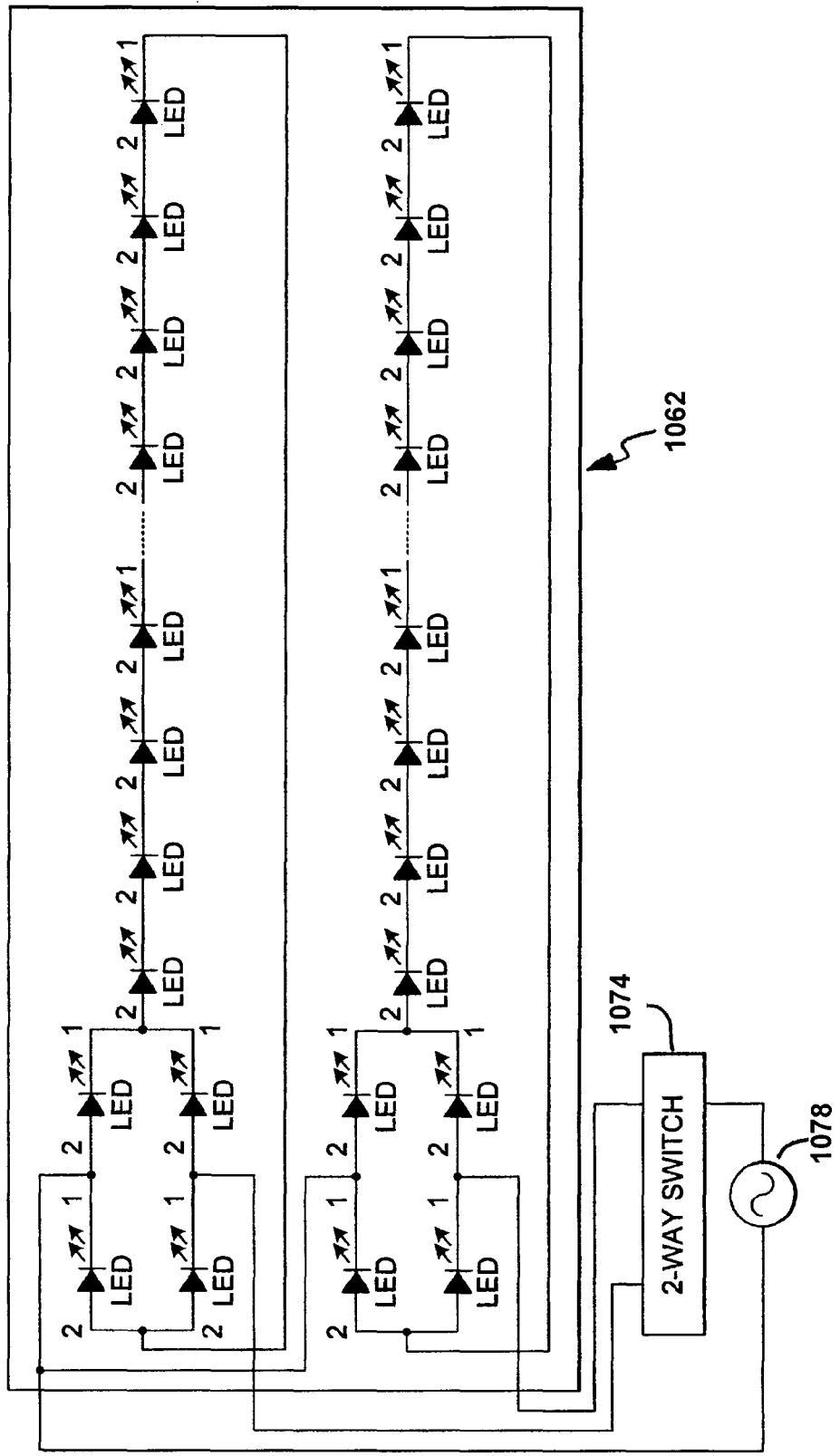
FIG. 13 is a schematic view of a multi-voltage and/or multi-brightness LED lighting device with a switch connected to an AC voltage source, according to an embodiment of the invention.

FIG. 13 discloses a schematic diagram the multi-brightness LED lighting device 1062 with a switch 1074 electrically connected between the multi-brightness LED lighting device 1062 and the AC voltage source 1078.

FIG. 13 discloses a schematic diagram of at least two single voltage LED circuits integrated with a single chip or within a substrate and forming a multi-voltage and/or multi-brightness LED device.

A package in certain applications may preferably also include a heat sink, a reflective material, a lens for directing light, phosphor, nano-crystals or other light changing or enhancing substances. In some embodiments, an LED circuit includes at least two LEDs. At least one of the at least two LEDs includes a different phosphor coating than that of at least one other LED of the at least two LEDs. In sum, according to one aspect of the invention, the LED circuits and AC drivers of the present invention permit pre-packaging of the LED portion of a lighting system to be used with standardized drivers of known specified voltage and frequency output. Such packages can be of varied make up and can be combined with each other to create desired systems given the scalable and compatible arrangements possible with, and resulting from, the invention.

According to an aspect of the invention, an LED circuit driver provides a relatively fixed voltage and relatively fixed frequency AC output such as mains power sources. The LED circuit driver output voltage and frequency delivered to the LED circuit may be higher or lower than mains power voltage and frequencies by using an LED circuit inverter driver.

The higher frequency LED circuit Inverter driver may be a electronic transformer, halogen or high intensity discharge (HID) lamp type driver with design modifications for providing a relatively fixed voltage as the LED circuit load changes. Meaning if the LED circuit inverter driver is designed to have an output voltage of 12V LED circuit driver would provide this output as a relatively constant output to a load having one or more than one LED circuits up to the wattage limit of the LED circuit driver even if LED circuits were added to or removed from the output of the LED circuit driver.

What is claimed is:

1. An LED lighting system comprising:
   at least one lighting device;
   at least one LED circuit integrated into the at least one lighting device, wherein the at least one LED circuit includes at least two LEDs that are mounted on a single substrate, and wherein at least one of the at least two LEDs includes a different phosphor coating than that of at least one other LED of the at least two LEDs;
   at least one driver having a first voltage input from an AC mains power source and providing a second lower voltage output to the at least one LED circuit,
   wherein the at least one lighting device is capable of being electrically coupled to an output of the at least one driver; and
   a switch configured to enable a change in a color of light emitted from the at least one lighting device to be set by an end user by causing one of at least a change in current or turning 'on' or 'off' the at least one LED with the different phosphor coating of the at least two LEDs in the at least one LED circuit, and
   wherein the switch has at least two positions selectable by the end user, and
   wherein the at least one LED circuit and the switch are integrated within the at least one lighting device such that the switch is positioned to enable actuation by the end user.

2. The LED lighting system of claim 1, wherein the at least two LEDs are electrically connected together in series or in parallel and are separated from each other by a distance of 3 mm or less.

3. The LED lighting system of claim 1, further comprising:
   a bridge rectifier.

4. The LED lighting system of claim 1, wherein the at least two LEDs in the at least one LED circuit are driven with an AC voltage of at least 6V.

5. The LED lighting system of claim 1, wherein the LED lighting system is integrated into an LED lamp.

6. The LED lighting system of claim 1, wherein the LED lighting system has at least one of a voltage level input to the at least one LED, a current level input to the at least one LED, or a brightness level input to the at least one LED that is selectable by the end user via the switch.

7. A lighting system comprising:
   at least one lighting device;
   at least one LED circuit integrated into the at least one lighting device,
      wherein the least one LED circuit includes at least two LEDs mounted on a substrate,
      wherein at least one of the at least two LEDs includes a different phosphor coating than that of at least one other LED of the at least two LEDs, and
      wherein the at least two LEDs are electrically connected together in series or in parallel and are separated from each other by a distance of 3 mm or less;
   at least one driver, including at least one bridge rectifier, wherein the at least one driver has a first voltage input from an AC mains power source and provides a second lower voltage output to the at least one LED circuit;
   a switch, wherein the switch is an end user controlled switch, wherein the switch is configured to enable a change in a color of light emitted from the at least one lighting device to be set by an end user by causing one of at least a change in current or turning 'on' or 'off' the at least one LED with the different phosphor coating of the at least two LEDs in the at least one LED circuit,
   wherein the at least one LED circuit is electrically configured by the end user controlled switch to be driven at one or more of multiple voltage levels, multiple current levels, or multiple brightness levels in response to the end user controlled switch,
   wherein the lighting system is connected to an AC voltage power source, and
   wherein the at least one lighting device, the at least one LED circuit, the at least one driver, and the switch are integrated into the lighting system such that the switch is positioned to enable actuation by the end user.

8. The lighting system of claim 7, wherein the at least one lighting device is integrated into a single LED package.

9. The lighting system of claim 7, wherein the at least two LEDs in the at least one LED circuit are driven with an AC voltage of at least 6V.

10. The lighting system of claim 7, wherein the at least one lighting device is integrated into an LED lamp.

11. The lighting system of claim 7, wherein the at least one lighting device has at least one of a voltage level input, a current level input, or a brightness level input that is selectable by the end user via the switch.

12. A lighting system comprising:

at least one lighting device;

at least one driver including at least one bridge rectifier, wherein the at least one driver has a first voltage input from a mains power source and provides a second lower voltage output to the at least one lighting device; and an LED circuit having two or more LEDs integrated in the at least one lighting device, wherein at least one, of the two or more LEDs, includes a different phosphor coating than that of at least one other LED of the two or more LEDs, the two or more LEDs being electrically connected together in series or in parallel;

a switch controllable by an end user to change a color of light emitted from the at least one lighting device by causing one of at least a change in current or turning 'on' or 'off' the at least one LEDs with the different phosphor coating of the two or more LEDs in the LED circuit, wherein the lighting system is driven with an AC power source, and wherein the at least one lighting device, the LED circuit, the at least one driver, and the switch are integrated in the lighting system such that the switch is positioned to enable actuation by the end user.

13. The lighting system, of claim 12, wherein the two or more LEDs are separated from each other by a distance of 3 mm or less.

* * * * *